(No Model.)

F. B. HAYS & C. E. TEFFT.
STRAINER FOR TEA OR COFFEE POTS.

No. 471,116. Patented Mar. 22, 1892.

Witnesses
A. Ruppert,
A. L. Hough

Inventors
Frederick B. Hays and
Charles E. Tefft
by Franklin H. Hough
their Attorney

UNITED STATES PATENT OFFICE.

FREDERICK B. HAYS AND CHARLES E. TEFFT, OF FALL RIVER, MASSACHUSETTS.

STRAINER FOR TEA OR COFFEE POTS.

SPECIFICATION forming part of Letters Patent No. 471,116, dated March 22, 1892.

Application filed November 24, 1891. Serial No. 412,979. (No model.)

*To all whom it may concern:*

Be it known that we, FREDERICK B. HAYS and CHARLES E. TEFFT, citizens of the United States, residing at Fall River, in the county of Bristol and State of Massachusetts, have invented certain new and useful Improvements in Strainers for Tea or Coffee Pots; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in strainers for tea or coffee; and it relates more particularly to that class of strainers that are adapted to be placed inside of tea or coffee pots and serve to hold the tea or coffee together in a compact mass while boiling.

The invention has for its object to simplify and cheapen the construction and to render more serviceable in operation this class of devices.

To these ends, and to such others as the invention may pertain, the same consists in the peculiar construction of the strainer, and in the novel manner of securing the parts together, whereby the sections may be readily separated or locked together. A suitable handle is also provided, whereby the strainer may be readily placed in the tea or coffee pot and removed from the same when desired.

The invention is clearly illustrated in the accompanying drawings, which, with the letters of reference marked thereon, form a part of this specification, like letters of reference indicating the same parts throughout the several views, and in which—

Figure 1:
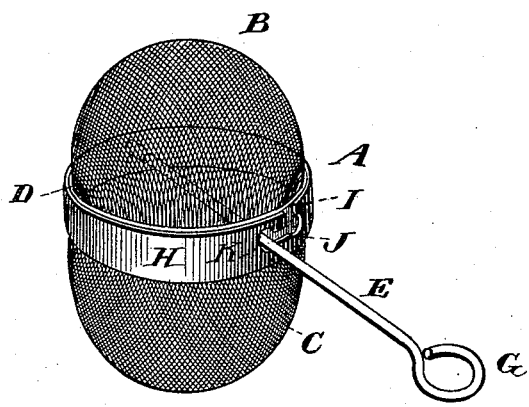
Figure 2:
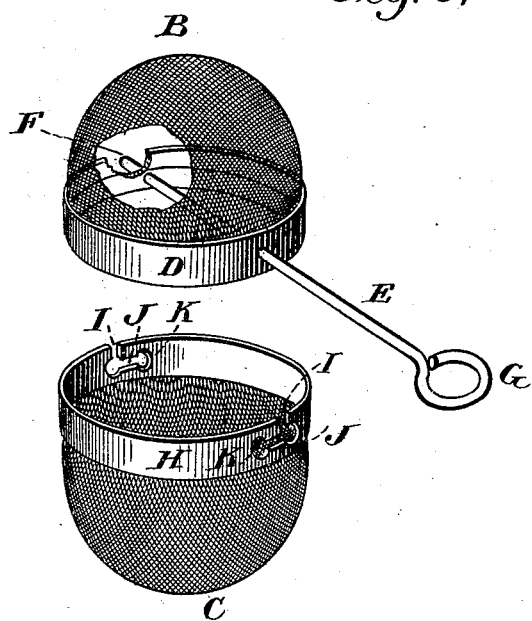

Figure 1 is a perspective view of the device complete, the sections being shown as locked together. Fig. 2 is a like view, in which the sections of the strainer are shown as separated, but in their relative positions.

Reference now being had to the details of the drawings by letter, A represents the body of the strainer, which is composed of two sections B and C. These sections are made of fine wire-cloth or wire-meshing, and in the present instance we have shown them each as semi-spherical; but it is evident that the form of the strainer may be varied, and instead of being spherical it may be made rectangular, elliptical, or in any fanciful form that the taste of the manufacturer may suggest.

The open end of the section B of the strainer is of slightly less diameter than the open end of the section C within which it fits, and it is provided at its extreme edge with a metallic band D, through which is passed a wire E, said wire being extended across the section, one end of the wire extending for a short distance beyond the outer face of the band D, as shown at F, and the other end of the wire being extended to form a suitable handle G. The section C is similar in form and construction to the section B, excepting that its open end is of a diameter sufficiently great to permit the open end of the section B to be received or fitted within it, the entrance or open end being provided with a metallic band H.

Upon opposite sides of the section C the band H is provided with vertical recesses I, which extend downward for a short distance from the outer edge of the said band H, and at points near the lower ends of said recesses narrow horizontal slits J are provided, which connect the said recesses I with openings K in the band H. It will be observed that the opening K upon one side of the section is at the right side of the recess I, while upon the other side of the section the recess extends in the opposite direction.

When it is proposed to lock the sections together, it is readily accomplished by placing the open end of the section B within the section C and turning the parts until the wire E enters the recesses I, when by turning slightly the wire will be sprung through the narrow slit J and will enter the openings K in the band, thus locking the sections securely together. By turning the sections in the opposite direction the sections may be readily released and lifted apart, as will be readily understood.

The handle may be made of any desired length, and it may be bent so as to adapt it for use in connection with any form of tea-kettle or coffee-pot.

Having thus described our invention, what we claim to be new, and desire to secure by Letters Patent, is—

The herein-described valveless strainer for tea or coffee pots, the same comprising two sections or cups of wire-meshing, each section being provided at its open end with a peripheral metallic band, the band of one section fitting within the band of the opposite section, and a wire passed through the band of the inner section and extending across said section and having one of its ends extended a short distance beyond the outer face of the band upon one side of the section and its other end passed through the opposite side of the section and extended to form a handle, the band upon the outer section being provided with vertical recesses I, openings K, and horizontal contracted slits J, connecting said openings with the recesses I, substantially as described.

In testimony whereof we affix our signatures in presence of two witnesses.

FREDERICK B. HAYS.
CHAS. E. TEFFT.

Witnesses:
WILLIAM F. STOREY,
HENRY H. EARL.